R. W. MANNING.
TAPPET FOR VALVES.
APPLICATION FILED JUNE 26, 1916.
1,212,980. Patented Jan. 16, 1917.
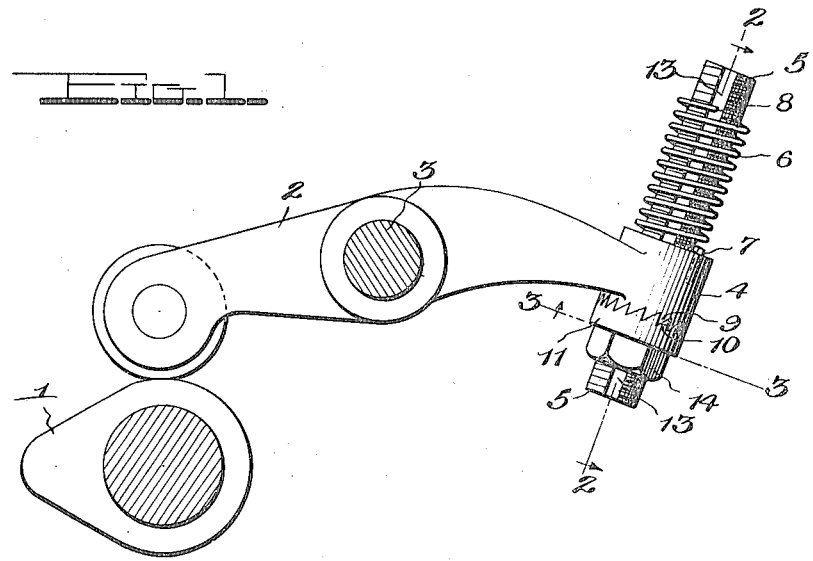
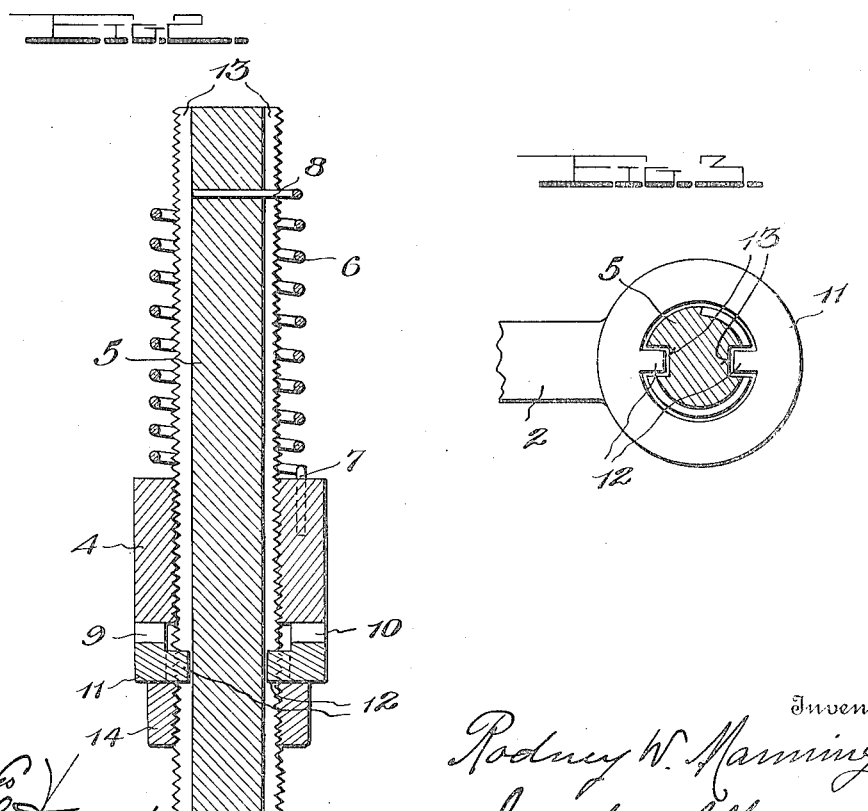

UNITED STATES PATENT OFFICE.

RODNEY W. MANNING, OF RIVERSIDE, RHODE ISLAND.

TAPPET FOR VALVES.

1,212,980.  Specification of Letters Patent.  Patented Jan. 16, 1917.

Application filed June 26, 1916. Serial No. 105,999.

*To all whom it may concern:*

Be it known that I, RODNEY W. MANNING, a citizen of the United States, residing at Riverside, in the county of Providence and State of Rhode Island, have invented a new and useful Improvement in Tappets for Valves, of which the following is a specification.

This invention relates to certain new and useful improvements in tappets for valves of the overhead type and has for its primary object to provide a self-compensating tappet for accommodating for the wear incidental to and accompanying the operation of an engine whereby the tappet will remain in proper relation with the valve or valve stem and eliminate unnecessary noises and improper operation.

Further, the invention resides in the parts and arrangements of parts hereinafter described and claimed, the accompanying drawing depicting the preferred form of the invention.

In the drawings—Figure 1 is an elevation of the present invention supported on the cam actuated lever. Fig. 2 is a longitudinal section on line 2—2 of Fig. 1 showing the tappet construction, and Fig. 3 is a transverse section of the tappet taken on line 3—3 of Fig. 1.

Referring more in detail to the drawing, the numeral 1 designates the usual rotating cam of an explosive engine employing the overhead type of valves, and 2 a lever rocked or oscillated by the cam about its pivotal mounting 3.

The end of the lever opposite to that engaged by the cam is formed with a sleeve part 4 which is internally threaded to receive the externally threaded rod 5. A coiled spring 6 surrounds the upper projecting end of the rod 5 and has its opposite ends 7 and 8 anchored to the sleeve part 4 and rod 5, respectively. The lower edge of the sleeve or nut part 4 is provided with an annular series of ratchet teeth 9 with which interlock companion ratchet teeth 10 of a disk 11. This disk is slidably related with the rod 5, relative rotary movement being prevented by the inwardly extending disk keys or lugs 12 slidably engaging in the key ways 13 which run longitudinally of the rod. A keeper in the form of a nut 14 is threaded on the lower end of the rod in contacting relation with the disk to hold the teeth of the latter in intermeshing relation with the teeth 9.

In operation, the rod 5 is advanced in the sleeve part until the lower end of the rod is in proper contact with the valve stem not here shown. When in this position the spring is under torsional strain so that as play occurs between rod 5 and the valve stem, due to wear, the spring will rotate the rod to advance it in the sleeve part, the nut 14 being loosened to permit ratchet teeth 10 riding the teeth 9.

The practical operative method consists in releasing the lock nut 14 to permit the disk 11 to drop down until the end of rod 5 contacts with the valve stem after which the disk is moved up so that its teeth wholly or partially mesh with teeth 9 and then locked in position by nut 14. Thus it is obvious that in this overhead valve operating mechanism, the tappet and valve stem are always properly related and timed for obtaining efficient results.

Having thus described my invention, what I claim as new and desire to secure by Letters Patent is—

1. In a device of the character described, a lever pivoted between its ends, an internally threaded sleeve part on one end thereof having an annular series of ratchet teeth on its lower edge, an externally threaded rod engaged with the threads of the sleeve part and provided with a longitudinal key way, a disk having an inwardly extending key slidably engaged in the way of the rod and a series of ratchet teeth interlocking with the sleeve teeth, a nut threaded on the rod for serving as a keeper to the disk, and a spring tending to turn the rod.

2. In a device of the character described, a lever pivoted between its ends, an internally threaded sleeve part on one end thereof having an annular series of ratchet teeth on its lower edge, an externally threaded rod engaged with the threads of the sleeve part and provided with a longitudinal key way, a disk element slidable on the rod in interlocking relation with the key way, said disk having a part for engaging the ratchet teeth of the sleeve, means releasably holding the disk part in engagement with the teeth of the sleeve, and means for rotating the rod in the sleeve part.

3. In a tappet for overhead valves, a lever having a sleeve part, a rod threaded through the sleeve part, a torsional spring on one end of the rod secured thereto and to the sleeve part, a disk on the other end of the rod having teeth engaging the sleeve part, and means releasably holding the disk teeth in engagement with the sleeve part, said disk being mounted on the rod for sliding only.

4. In a tappet for overhead valves, a lever having a sleeve part, a rod threaded through the sleeve part, a torsional spring on one end of the rod secured thereto and to the sleeve part, a disk disposed on the opposite end of the rod for sliding only and provided with means for interlocking with the sleeve part, and means for holding the disk on the rod.

5. In a tappet, a lever having a sleeve part on one end provided with a series of ratchet teeth, a rod threaded in the sleeve part, spring means tending to rotate the rod for advancing the latter in the sleeve part, means slidable on the rod for engaging the teeth of the sleeve part, and means releasably holding the second means in engagement with the teeth of the sleeve part.

6. In a tappet, a lever, a rod movable thereon toward a valve stem, means releasably holding the rod in an adjusted position, and means for advancing the rod when released from said first means.

7. In a tappet, a lever, means adjustably arranged on the lever for engaging a valve stem, means releasably holding the first means against movement on the lever, and other means for moving said first named means to take up play between the latter and the valve stem when said second means is inoperative.

In testimony whereof I have signed my name to this specification in the presence of two subscribing witnesses.

RODNEY W. MANNING.

Witnesses:
ADA E. HAGERTY,
J. A. MILLER.